United States Patent
Veninger

(10) Patent No.: US 7,469,543 B2
(45) Date of Patent: Dec. 30, 2008

(54) RICH CATALYTIC INJECTION

(75) Inventor: Albert Veninger, Coventry, CT (US)

(73) Assignee: United Technologies Corporation, Hartford, CT (US)

( * ) Notice: Subject to any disclaimer, the term of this patent is extended or adjusted under 35 U.S.C. 154(b) by 557 days.

(21) Appl. No.: 10/954,323

(22) Filed: Sep. 30, 2004

(65) Prior Publication Data

US 2006/0064987 A1    Mar. 30, 2006

(51) Int. Cl.
*F23R 3/40*    (2006.01)
(52) U.S. Cl. .......................... 60/723; 60/737
(58) Field of Classification Search ............... 60/723, 60/732, 733, 737, 777; 431/170
See application file for complete search history.

(56) References Cited

U.S. PATENT DOCUMENTS

| | | | |
|---|---|---|---|
| 5,431,017 A | 7/1995 | Kobayashi et al. ............ 60/723 |
| 6,237,343 B1 * | 5/2001 | Butler ........................ 60/723 |
| 6,358,040 B1 | 3/2002 | Pfefferle et al. |
| 6,415,608 B1 * | 7/2002 | Newburry .................... 60/723 |
| 6,923,001 B2 * | 8/2005 | Laster et al. ................. 60/723 |
| 2002/0160330 A1 | 10/2002 | Eroglu et al. ............... 431/278 |
| 2004/0050054 A1 | 3/2004 | Bruck et al. ................. 60/723 |

FOREIGN PATENT DOCUMENTS

| WO | WO 02/27243 | 4/2002 |
|---|---|---|
| WO | WO 03/029725 | 4/2003 |
| WO | WO2004/020901 | 3/2004 |

* cited by examiner

*Primary Examiner*—Louis J Casaregola
(74) *Attorney, Agent, or Firm*—Carlson, Gaskey & Olds PC

(57) ABSTRACT

A gas turbine engine includes a compressor, a rich catalytic injector, a combustor, and a turbine. The rich catalytic injector includes a rich catalytic device, a mixing zone, and an injection assembly. The injection assembly provides an interface between the mixing zone and the combustor. The injection assembly can inject diffusion fuel into the combustor, provides flame aerodynamic stabilization in the combustor, and may include an ignition device.

3 Claims, 3 Drawing Sheets

RICH CATALYTIC INJECTION

NOTICE OF GOVERNMENT RIGHTS

The present invention was made with Government support under a contract awarded by the Department of Energy. The Government has certain rights in the present invention.

FIELD OF THE DISCLOSURE

The present disclosure is generally related to combustion devices and, more particularly, to a rich catalytic injector for combustion systems such as gas turbine engines.

BACKGROUND OF THE DISCLOSURE

Combustion devices, including gas turbine engines, must comply with ever increasing regulatory emissions standards while maintaining or optimizing performance and cost. Mandated emissions regulations to reduce oxides of nitrogen (NOx) are the main driving force behind the development of new and costly technologies involving premixed combustion, catalytic systems, and post combustion clean-up. To comply with these emission standards, fuel-lean and fuel-rich catalytic systems have been proposed.

Lean-burning catalytic systems have advanced significantly to provide a stable (dynamic-free) burn with low NOx emissions. However, such systems require preheating of the gas flow as the catalyst will not light at standard combustor inlet temperatures. To preheat the gas to necessary inlet temperatures, a pre-burner is located upstream of the catalyst. Additionally, if the temperature rise required by the engine cycle is higher than what the catalyst can provide, then a post catalytic burner is also required. These preburners and post burners can be the primary source of NOx emissions for lean-burn catalytic systems.

Fuel-rich catalytic systems are much more active at lower temperatures than the fuel lean catalytic systems. However, even the fuel-rich catalytic systems cannot operate below a certain engine rpm or temperature, and accordingly, such fuel-rich systems may also face a light-off problem. Should the catalytic system fail, such fuel-rich systems begin to resemble, in terms of performance, a conventional lean premix system and become incapable of sustaining combustion for the entire range of engine operation. Additionally, conventional fuel-rich catalytic systems do not provide mechanisms or methods for controlling flame aerodynamic stability, for controlling the combustion process, for providing ignition sources, or for introducing diffusion fuel streams for combustion at engine operating conditions beyond the range of catalytic, device operability, or, in the case when the catalytic device fails and the combustion regime reverts to conventional lean premixed combustion, for the utilization of diffusion fuel in abating dynamic fluctuations associated with lean premixed combustion.

Therefore, there is a need for a system and method that can operate in a fuel-rich catalytic system mode or a diffusion fueled mode while controlling flame aerodynamic stability and the combustion process, and abating the dynamic fluctuations associated with lean premixed combustion, should the catalytic system fail.

SUMMARY OF THE DISCLOSURE

In accordance with one aspect of the present disclosure, a gas turbine engine includes a compressor, a turbine operatively coupled to the compressor by a shaft assembly, a combustor downstream of the compressor, and a rich catalytic injector disposed between the compressor and the combustor. The rich catalytic injector includes a rich catalytic device downstream of the compressor, a mixing zone for additional air downstream of the rich catalytic device, and an injection assembly disposed between the mixing zone and the combustor, the injection assembly operatively coupling the mixing zone with the combustor.

In accordance with another aspect of the present disclosure, a method of combustion in a gas turbine engine includes catalytically reacting a fuel rich mixture in a rich catalytic device, to produce a reacted and heated fuel-air mixture prior to further mixing with additional air in a mixing zone to provide a heated fuel-air mixture, and injecting the heated fuel-air mixture into a combustor with an injection assembly. The injection assembly controls the flow and burn characteristics of the heated fuel-air mixture in the combustor.

In accordance with yet another aspect of the present disclosure, a catalytic injection system for a combustor include a rich catalytic device, a mixing zone downstream of the rich catalytic device, the mixing zone having an outlet, and an injection assembly disposed between the outlet of the mixing zone and an inlet of the combustor. The injection assembly includes an end cap or other bluff body blocking a central portion of the inlet of the combustor.

In accordance with yet another aspect of the present disclosure, a catalytic injection system for a combustor includes a rich catalytic burner, a first mixing zone disposed downstream of the rich catalytic burner, a second mixing zone disposed downstream of the first mixing zone, and a center body surrounded by the rich catalytic burner, the first mixing zone, and the second mixing zone. The center body and the second mixing zone are configured to interface with the combustor.

Figure 1:
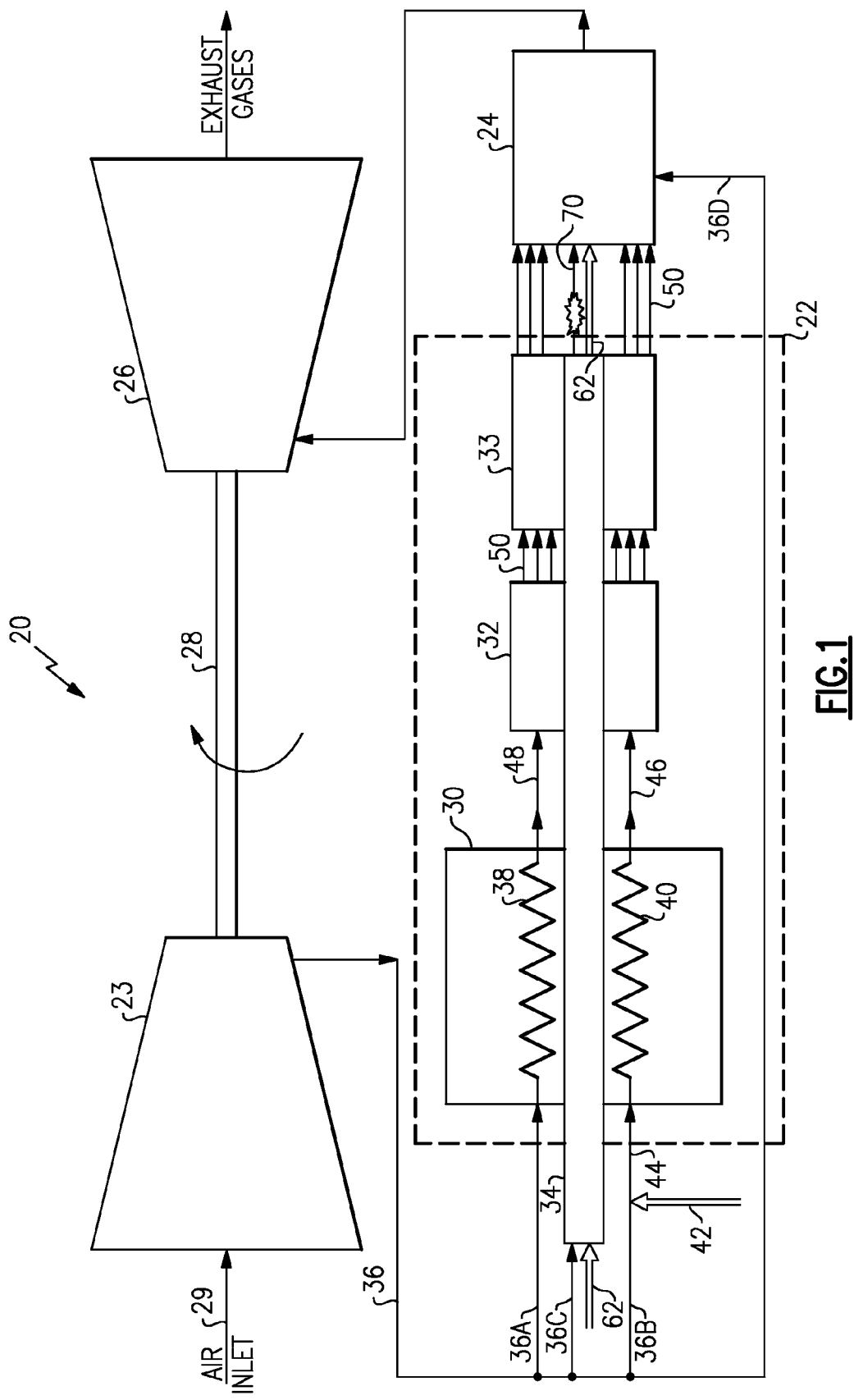
FIG. 1 is a schematic diagram of a gas turbine engine including a rich catalytic injector constructed in accordance with the teachings of the present disclosure.

While the following disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION

Referring to the FIG. 1, a combustion device, such as gas turbine engine 20, using a rich catalytic injector 22 constructed in accordance with the teachings of the present disclosure is schematically shown. While only schematically represented, it is to be understood that the teachings of the present disclosure can be employed with any number of gas turbine engine designs for air and land based use. Moreover, the rich catalytic injector 22 of the present disclosure can be used in a multitude of combustion devices such as furnaces for heat and processing equipment and other types of engines including, but not limited to, internal combustion engines, such as Otto cycle engines or diesel engines.

The gas turbine engine 20 generally includes a compressor 23, the rich catalytic injector 22, a combustor 24 and a turbine 26. The compressor 23 and the turbine 26 are typically mounted on the same shaft assembly 28. A fluid, such as air, is brought into the engine 20 through the inlet 29, compressed by the various stages of the compressor 23, and directed to the combustor 24 where it is combined with fuel and combusted. The resulting hot combustion gases are directed to the rotating blades (not shown) of the various stages of the turbine 26, causing rotation of the blades, and by way of the turbine blades being connected to the shaft assembly 28, causing the rotation of the compressor 23. The result is a continual self-perpetuating motion once initiated and supplied with fuel.

As stated above, the compressor 23 receives air from the air inlet 29 and provides a stream of compressed air 36 for combustion and, if necessary, for other purposes (such as providing cooling air to the turbine 26). A detailed discussion of the air used for these other purposes is unnecessary for an understanding of the present invention, and is not provided. The stream of compressed air 36 is split into the air streams 36A, 36B, 36C and 36D. Air streams 36A, 36B, and 36C are provided to the rich catalytic injector 22, and the stream 36D is diverted to the combustor 24 for cooling, combustion quench, or combustion staging as needed.

Figure 2:
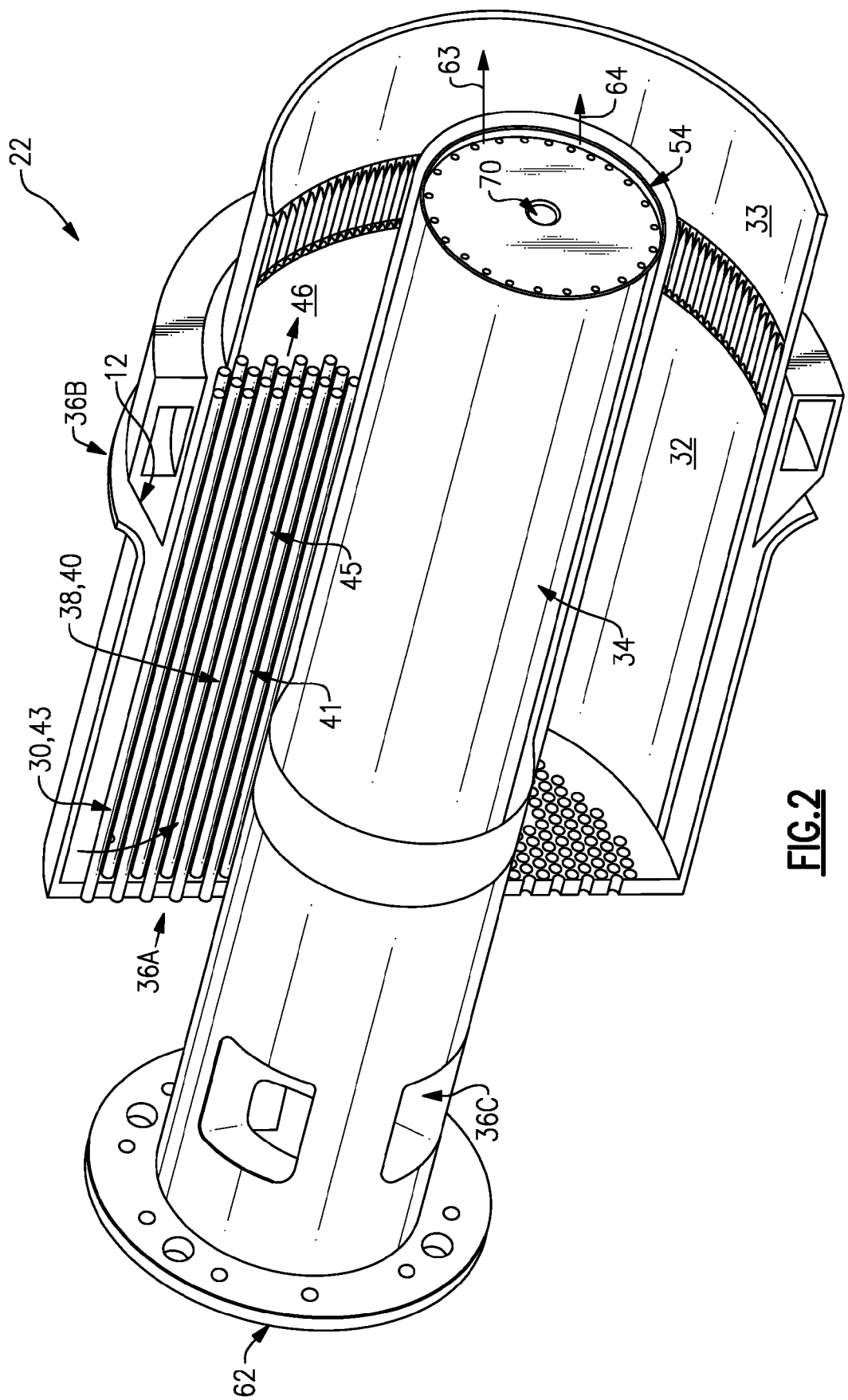
FIG. 2 is a perspective cross-sectional view of the rich catalytic injector of FIG. 1.
Figure 3:
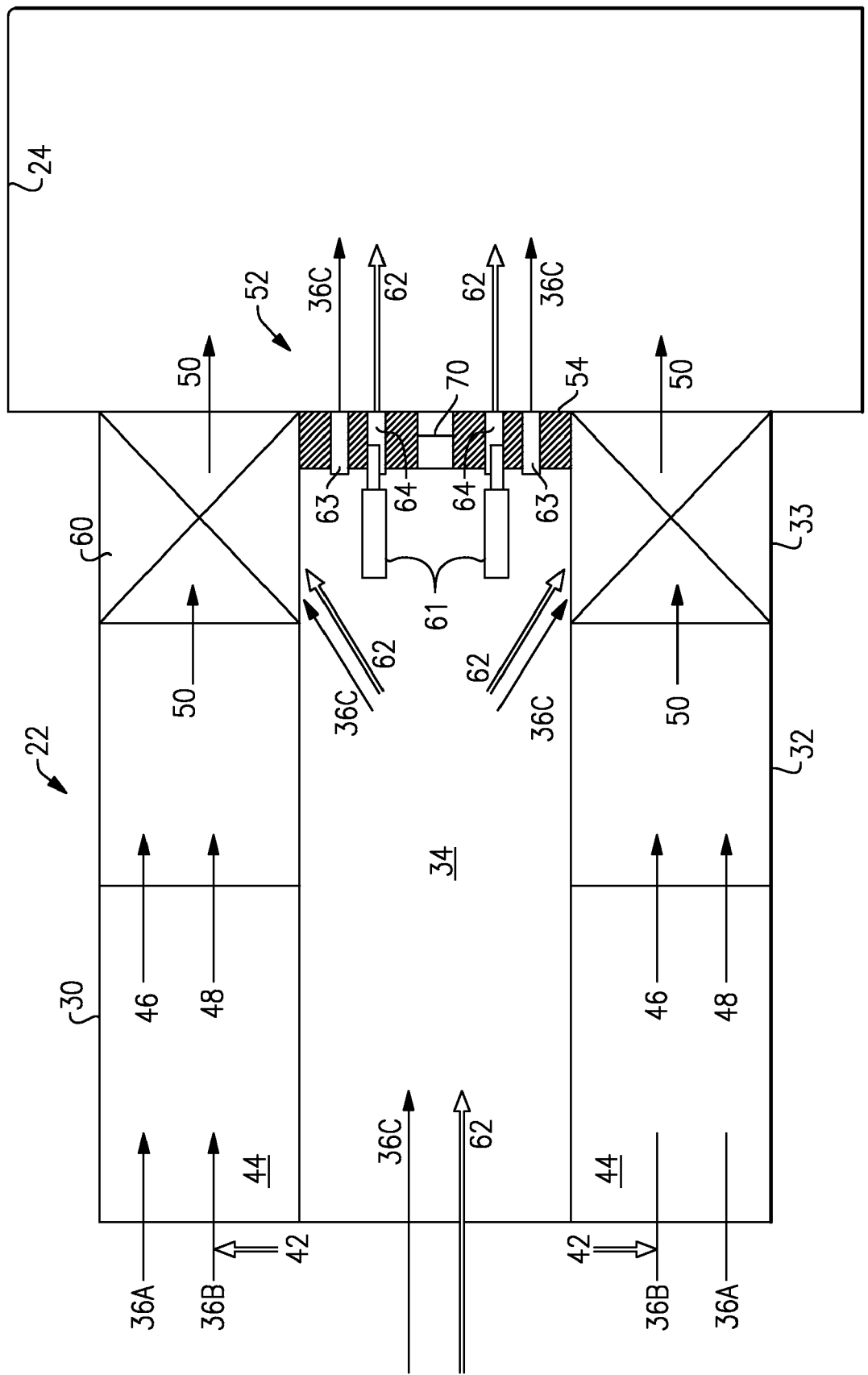
FIG. 3 is a schematic cross section of the rich catalytic injector of FIG. 2.

The rich catalytic injector 22 is disposed downstream of the compressor 23 and upstream of the combustor 24. Referring to FIGS. 2 and 3, the disclosed rich catalytic injector 22 includes a rich catalytic device 30, a first mixing zone 32, a second mixing zone 33, and a center body 34. The rich catalytic device 30, the first mixing zone 32, and the second mixing zone 33 are generally annular and surround the center body 34. The second mixing zone 33 and the center body 34 provide an interface between the rich catalytic device 30 and the combustor 24. As will become apparent from the following disclosure, the second mixing zone 33 and the center body 34 can inject diffusion fuel into the combustor 24 and provide flame aerodynamic stabilization in the combustor 24.

The rich catalytic device 30 includes a heat exchanger 38 and a rich catalytic reactor 40. The air stream 36A is provided to the heat exchanger 38, while the air stream 36B is mixed with fuel 42 to produce a fuel-rich mixture 44. The fuel-rich mixture 44 is provided to the rich catalytic reactor 40, where it is partially burned in a catalytic process to provide a heated fuel 46. Referring to FIG. 2, the rich catalytic reactor 40 includes a plurality of passages 41 disposed in a housing 43. A number of connected tubes 45 may form the passages 41, or alternately, the passages may be formed by spaces between a number of plates and fins (not shown) that are arranged in the housing. All or portions of the passages 41 may be coated with a catalyst that comes into contact with the fuel-rich mixture 44 when passing through the passages 41. The catalyst can be rhodium or any one of the other metals in the platinum family, such as platinum, palladium, iridium, and ruthenium.

The fuel-rich mixture 44 is oxidized in the rich catalytic reactor 40 to generate the heated fuel 46. The heat from the catalytic burning of the fuel-rich mixture 44 is controlled by being absorbed by the air stream 36A through the heat exchanger 38. Accordingly, the heat exchanger 38 controls the catalytic reaction temperature in the rich catalytic reactor 40 and ensures the mechanical integrity of the reactor surfaces. Thus, the air stream 36A exits the heat exchanger 38 as heated air 48. The heated air 48 and the heated fuel 46 are then combined and mixed in the first mixing zone 32 to provide a heated lean fuel-air mixture 50. An example of a rich catalytic device 30 is disclosed in U.S. Pat. No. 6,358,040.

In the disclosed example, the rich catalytic device 30, the first mixing zone 32, and the second mixing zone 33 surround and envelope the center body 34. Referring to FIG. 2, the rich catalytic device 30, the first mixing zone 32, and the second mixing zone 33 are generally annular in shape to define a through bore for housing and surrounding the center body 34. The annular shape promotes penetration of the fuel-rich mixture 44 and air through the plurality of passages 41 of the rich catalytic device 30. Although the disclosed rich catalytic device 30 is annularly shaped, other shapes for the rich catalytic device 30 may be used to promote the above-noted penetration of the fuel-rich mixture 44 and air through the plurality of passages 41.

Referring to FIGS. 1-3, the second mixing zone 33 and the center body 34 function as an interface between rich catalytic device 30, the first mixing zone 32, and the combustor 24. Accordingly, the center body 34 and the second mixing zone 33 may be referred to herein as an injection assembly. The fuel-air mixture 50 passes through the second mixing zone 33 from the first mixing zone 32 and enters the combustor 24 at a centrally positioned inlet area 52 (shown in FIG. 3) of the combustor 24. Additional fuel and air may be provided to the fuel-air mixture 50 in the second mixing zone 33. The additional fuel may be in the form of diffusion fuel 62, which is fuel that is not pre-mixed with the fuel-air mixture 50. The diffusion fuel 62 can be provided to the second mixing zone 33 from the center body 34. The additional air 36C, delivered by the center body 34, can be used to mix with existing fuel-air mixture 50 in the second mixing zone 33 to form modified or additional mixtures in the second mixing zone 33. The additional air 36C can also be used for cooling the first mixing zone 32, the second mixing zone 33, and the center body 34.

As shown schematically in FIG. 3, the second mixing zone 33 may include air and fuel turning and conveyance devices 60 to provide additional mixing therein. The air and fuel turning and conveyance devices 60 can impart swirl to the fuel-air mixture 50 and the additional fuel and air that may be provided through the center body 34 prior to entering the combustor 24. For example, the air and fuel turning and conveyance devices 60 could be radially directed vanes (not shown) that can impart rotation to the fluid flow passing thereby (i.e., convert axial flow to radial flow). The vanes could include ducts that lead to a number of fuel spray devices (not shown) on the vanes to spray diffusion fuel 62 in the fuel-air mixture 50. Additionally, the air and fuel turning conveyance devices 60 can be configured to deliver the fuel-air mixture 50 and the additional fuel and air that may be provided through the center body 34 to targeted regions of the combustor 24. The swirling of the fuel and air in the second mixing zone 33 and the targeting of particular regions of the combustor 24 can improve the flame aerodynamic stability in the combustor 24.

An end cap 54 is positioned at the inlet area 52 (shown in FIG. 3) where the center body 34 interfaces with the combustor 24. The end cap 54 closes the end of the center body 34 where the center body 34 interfaces with the combustor 24. The end cap 54 may provide a partial blockage region downstream of the inlet area 52 of the combustor 24 that is relatively devoid of the heated fuel-air mixture 50. The end cap 54 may be flat, conical, or gently rounded (i.e., a bluff body). The blockage of the inlet area 52 can provide enhanced recirculation and flame aerodynamic stability in the combustor 24. The end cap can be made from a high temperature, durable material such as commonly available high temperature nickel based alloys or reinforced ceramics that can withstand the thermal loads imposed by the combustor 24. The end cap 54 can be also cooled to ensure its thermo-mechanical integrity. For example, the end cap 54 can have internal passages through which an air stream 36C can travel to cool the end cap 54.

As shown in FIGS. 2 and 3, the center body 34 receives the diffusion fuel 62 and the air stream 36C. As described above, the diffusion fuel 62 and the additional air from the air stream 36C can be added to the second mixing zone 33. The diffusion fuel 62 and additional air from the air stream 36C can also be conveyed to the end cap 54 through the center body 34. The end cap 54 can in turn supply the combustor 24 with air and fuel in addition to the heated fuel-air mixture 50 that may be provided to the combustor 24 from the second mixing zone 33. The additional air 36C, delivered by the center body 34, can be used to mix with existing fuel-air mixture 50 in the end cap 54 to form modified or additional mixtures in the end cap 54. The end cap 54 may include one or more air ports 63 (shown in FIGS. 2 and 3) for providing air from the air stream 36C to the combustor 24. The end cap 54 may also include one or more fuel injectors 61 (schematically shown in FIG. 3) that inject the diffusion fuel 62 directly into the combustor 24 through a number of fuel injection ports 64 (shown in FIGS. 2 and 3). Additionally, the inner walls of the combustor 24 can include a number of fuel injectors (not shown) for injecting diffusion fuel 62 into the combustor 24. Diffusion fuel 62 can be injected into the combustor 24 to provide combustion stability by controlling hotspots. The injection of diffusion fuel 62 into the combustor 24 can stabilize the combustion process in the combustor 24 and may abate dynamic fluctuations that may be associated with lean premixed combustion. Such dynamic fluctuations are often referred to as combustion noise. The abatement of combustion-noise is important should the catalytic reactor 38 fail in any way to perform its fuel-rich catalysis.

Additionally, the catalytic reactor 38 may not be able to provide the necessary catalytic reaction at low engine rpm to sustain combustion in the combustor 24. Such low engine rpm may occur during low power operating mode, engine startup, or a drop load event that may necessitate a throttle pull back. By injecting diffusion fuel 62 into the combustor 24 either through the end cap 54, the second mixing zone 33, or the fuel injectors that may be disposed in the combustor 24, the operation of the engine 20 can be sustained at low engine rpm. Also, should deactivation of the catalyst occur, all of the features and components contained in the rich catalytic injector 22 can continue to operate as a lean premixed injector without the rich catalysis in operation.

The injection assembly 34 may include an ignition source 70 to ignite the heated fuel-air mixture 50 that has entered the combustor 24. In typical combustors, igniters (not shown) are located on the wall of the combustor 24. The positions of the igniters are determined so that they are most effective. The ignition source 70 may either replace or be an addition to the igniters of the combustor 24. The ignition source 70 is of the type typically used in combustors. Such ignition sources 70 generate a spark or a pilot flame (also referred to as torch ignition) to ignite the fuel-air mixtures entering the combustor 24. A pilot flame or torch can utilize some portion of additional fuel 62 and additional air 36C. The ignition source 70 may be centrally positioned near the inlet portion 52 of the combustor 24. Accordingly, as shown in FIGS. 2 and 3, the ignition source 70 may be housed by the end cap 54.

From the foregoing, one of ordinary skill in the art will readily understand that the teachings of the present disclosure can be employed to construct a combustion device, such as a gas turbine engine having a fuel-rich catalytic injector. The rich catalytic injector has features such as a catalytic reactor, end caps, diffusion fuel injectors and ports, ignition sources, and air and fuel turning and conveyance devices, provide the engine with aerodynamic stability, combustion stability, lessened dynamic fluctuations, and the ability to continue to operate as a combustion device during engine conditions when the catalyst is inactive or in circumstances where the catalyst fails to activate (such as contamination or catalyst element failure).

Persons of ordinary skill in the art will appreciate that, although the teachings of the present disclosure have been illustrated in connection with certain examples, there is no intent to limit the present disclosure to such examples. On the contrary, the intention of this application is to cover all modifications and examples fairly falling within the scope of the teachings of the present disclosure.

What is claimed is:

1. A gas turbine engine comprising:
   compressor;
   a turbine operatively coupled to the compressor by a shaft assembly;
   a combustor downstream of the compressor; and
   a rich catalytic injector disposed between the compressor and the combustor, wherein the rich catalytic injector comprises a rich catalytic device, a mixing zone downstream of the rich catalytic device, and an injection assembly disposed between the mixing zone and the combustor, the injection assembly operatively coupling the mixing zone with the combustor, wherein the injection assembly includes a center body having an end cap to provide flow blockage and flow directing in a central inlet portion of the combustor, and wherein the center body is surrounded by the rich catalytic device and the mixing zone.

2. A gas turbine engine comprising:
   compressor;
   a turbine operatively coupled to the compressor by a shaft assembly;
   a combustor downstream of the compressor; and
   a rich catalytic injector disposed between the compressor and the combustor, wherein the rich catalytic injector comprises a rich catalytic device, a mixing zone downstream of the rich catalytic device, and an injection assembly disposed between the mixing zone and the combustor, the injection assembly operatively coupling the mixing zone with the combustor, wherein the injection assembly comprises a second mixing zone.

3. The gas turbine engine of claim 2, wherein the second mixing zone comprises at least an air and fuel turning or swirl device and an air and fuel conveyance device.

* * * * *

UNITED STATES PATENT AND TRADEMARK OFFICE
CERTIFICATE OF CORRECTION

PATENT NO.         : 7,469,543 B2
APPLICATION NO. : 10/954323
DATED              : December 30, 2008
INVENTOR(S)        : Veninger It is certified that error appears in the above-identified patent and that said Letters Patent is hereby corrected as shown below:

Claim 1, Column 6, Line 27: add --a-- before compressor.

Claim 2, Column 6, Line 44: add --a-- before compressor.

Signed and Sealed this

Twenty-fourth Day of March, 2009

JOHN DOLL
*Acting Director of the United States Patent and Trademark Office*